United States Patent Office 2,967,888
Patented Jan. 10, 1961

2,967,888

PROCESS FOR THE PURIFICATION OF KETENE

Theodor Altenschöpfer, Eduard Enk, and Hellmuth Spes, Burghausen, Germany, assignors to Wacker-Chemie G.m.b.H., Munich, Germany, a firm No Drawing. Filed Oct. 22, 1958, Ser. No. 768,844

Claims priority, application Germany Oct. 24, 1957

13 Claims. (Cl. 260—585.5)

In accordance with the process most widely employed commercially for the production of ketene, acetic acid is thermally decomposed at reduced pressure in the presence of a catalyst. The gaseous decomposition product so obtained is freed of the water and acetic acid present by cooling the reaction product so that these components are condensed but it is usually found that the reaction product still contains a certain percentage of acetic anhydride. The presence of acetic anhydride in the ketene so produced does not cause any difficulty if the ketene is to be utilized for the preparation of acetic anhydride. However, for many other purposes, such as in the production of isopropenyl acetate, the ketene must not only be free of all acetic anhydride but of all other impurities as well. It has been observed that the paraffin base lubricating oils which serve for the lubrication of the vacuum pumps employed in carrying out this catalytic thermal decomposition of acetic acid absorb limited amounts of the acetic anhydride present and by a suitable treatment the latter can then be separated from the oils. The purification of ketene by this means is not entirely practical since the solubility of acetic anhydride in these paraffin base lubricating oils is actually quite low and the extraction of the acetic anhydride from the reaction product is quite inefficient.

It is, therefore, an important object of this invention to provide an efficient and economical process for the purification of ketene containing small amounts of acetic anhydride whereby ketene free of acetic anhydride may be readily obtained.

Another object of this invention is the provision of an extraction process for the separation of impurities from ketene wherein the extracted impurities may be readily separated from the solvent employed.

Other objects of this invention will be apparent from the following detailed description.

It has now been found that the impurities present in ketene prepared by the thermal decomposition of acetic acid, for example, may be separated therefrom, after the water and acetic acid present have been removed by condensation, if the ketene so obtained is brought into contact with a liquid extractant which is unreactive in the presence of ketene, acetic anhydride and diketene, and which has only a very limited solubility for ketene and polymers of ketene yet which is a solvent for acetic anhydride and diketene at elevated temperatures with only a limited solubility for acetic anhydride and diketene at lower temperatures. Thus, by employing an extractant having these properties for the treatment of crude ketene obtained by the thermal decomposition of acetic acid, not only are the acetic anhydride and diketene readily removed therefrom, but the ketene, due to its insolubility in the extractant, is readily separated therefrom by providing suitable separator means for effecting the phase separation of the resulting immiscible components. Furthermore, although soluble in the extractant at higher temperatures, in view of the relative insolubility of the acetic anhydride and diketene at low temperatures, the extractant is easily separated from these impurities by cooling the mixture which remains after the ketene is removed and then taking advantage of the phase separation which results when the mixture of solvent and impurities is cooled to a lower temperature.

Of the liquids suitable for use in the process of this invention there may be mentioned hexachlorobutadiene and those aliphatic ethers, either symmetrical or unsymmetrical such as, for example, di-n-hexyl ether, di-n-butyl ether, di-($\alpha$-ethyl)-butyl ether and di-($\alpha$-ethyl)-hexyl ether. The ethers which are suitable should have a boiling point above 100° C. and preferably, above 130° C. These liquids have been found to possess a high order of solubility for the impurities found in ketene which has been obtained by the thermal decomposition of acetic acid, and, by utilizing these liquids for washing the reaction product formed by the thermal decomposition, all of the impurities which are present in the ketene such as acetic anhydride, diketene, etc., are readily and completely removed.

When employed at a temperature of 0 to 60° C. or even at higher temperatures such as 90° C., the particular solvents mentioned above exhibit a very marked solvent power for the acetic anhydride and the other impurities normally present in the gaseous thermal decomposition reaction product but their solubility in said solvents is reversed when the solvents are cooled to a lower temperature. When the said solvents are cooled sufficiently, it has been observed that the impurities separate or phase out almost completely. The separation at low temperatures is especially noted in the case of hexachlorobutadiene.

By passing the hexachlorobutadiene or any of the above aliphatic ethers in a cycle from the suction side to the pressure side of the vacuum pump, with the intermediate removal of the impurities by cooling, the ketene produced can be purified completely and in a continuous fashion.

In bringing the gaseous reaction product from the acetic acid thermal decomposition reaction into contact with the solvents employed in order to remove the impurities from the ketene so formed, any suitable apparatus may be employed for bringing about intimate gas-liquid contact such as spray towers or bubble-cap columns. Intimate contact of the solvents with the gases may also be obtained by bringing the solvent into contact with the gaseous reaction products in the vacuum pump utilized for removing the gaseous reaction products from the reactor. For this purpose it has been found that centrifugal pumps or vacuum pumps provided with a liquid seal, and especially those having an annular chamber, are particularly suited for this purpose. The solvent liquid utilized, which may be either hexachlorobutadiene or one of the other ethers mentioned, is then cycled and, after leaving the pump in which it was maintained at a temperature of 0° C. to 90° C., it is then cooled to a temperature of from 20° C. to a temperature as low as —40° C. or even below in the case of hexachlorobutadiene. Employing a suitable liquid trap or liquid separator, a discrete upper layer forms of which in addition to the hexachlorobutadiene about half is acetic anhydride, which also contains small amounts of diketene. By cooling to a temperature of about —30° C. the upper layer which is formed in the liquid trap contains little more than about 20% or so of the hexachlorobutadiene or ether solvent. It is particularly advantageous when chemically resistant materials are employed in constructing the pumps employed that no corrosion takes place in order to avoid the introduction of any impurities whatsoever. The cycling of the liquid solvent and the purification of the ketene can be readily carried out in a continuous manner. The ketene leaving the pressure side of the vacuum pump after being separated is of very high purity and, without any further treatment, can be employed in very delicate and sensitive chemical reactions such as the production of isopropenyl acetate, or the production of beta-methoxy ethers, etc.

In order further to illustrate this invention, the following examples are given:

*Example 1*

283.5 kilos of crude ketene containing acetic anhydride as an impurity and obtained by the thermal decomposition of acetic acid at reduced pressure are brought into intimate contact with hexachlorobutadiene in a vacuum pump provided with a liquid seal driven by hexachlorobutadiene under pressure. The temperature within the pump is maintained at 30–40° C. by suitable regulation of the internal temperature and at this temperature the acetic anhydride and diketene are completely miscible with the hexachlorobutadiene. The mixture of ketene and hexachlorobutadiene leaving the pressure side of the pump is discharged into a separator. The ketene removed from the separator is entirely free of anhydride and contains only 0.5% of hexachlorobutadiene, which can be largely removed in a cooler. The hexachlorobutadiene phase removed from the separator, which phase contains the anhydride and the diketene originally present in the crude ketene, is cooled to a temperature of −10° C. to −13° C. and the low temperature separates the mixture into an upper layer containing 63.1% acetic anhydride, 7.4% diketene and 28.1% hexachlorobutadiene. The lower layer which forms contains 6% of acetic anhydride, 0.8% diketene and 93.2% hexachlorobutadiene and is cycled back to the centrifugal pump where it is again brought into contact with crude ketene. During this run 10 kilos of acetic anhydride and 1.84 kilos of diketene are removed.

If the hexachlorobutadiene phase is cooled to a temperature of −30° C. the amount of hexachlorobutadiene in the upper layer can be reduced to 16.4%. The pump impellers remain clean during the processing and do not become coated with tars or resins, and the hexachlorobutadiene can be employed in a continuous operation since the impurities remain in solution in the upper layer which separates on cooling.

*Example 2*

164.5 kilos of crude ketene obtained as described in Example 1 are processed in similar fashion employing di-n-butyl ether as the solvent medium, but the temperature in the pump is maintained just above 0° C. The di-n-butyl ether layer obtained after the ketene is separated is then cooled to a temperature of −25° C. and this layer is thus separated into two phases, a lower layer consisting essentially of a layer containing the impurities from the crude ketene and some di-n-butyl ether and an upper layer which is almost entirely di-n-butyl ether. About 6.075 kilos of acetic anhydride corresponding to 3.7% of the crude ketene and 1.15 kilos of diketene corresponding to 0.7% of the crude ketene are removed.

*Example 3*

201 kilos of crude ketene are treated in accordance with the process described in Examples 1 and 2, but in this instance di-n-hexyl ether is employed as the extractant. The pump temperature is maintained at 50° C. and the di-n-hexyl ether layer obtained after the separation of the ketene is then cooled to a temperature of 0° C. The lower layer which forms at this temperature contains 94.3% acetic anhydride together with a small amount of diketene and di-n-hexyl ether. The upper layer is essentially di-n-hexyl ether which is recycled back to the process. In this manner there are separated 7.44 kilos of acetic anhydride and 1.41 kilos of diketene, the acetic anhydride being 3.8% of the crude ketene and the diketene being 0.7% of the crude ketene produced.

*Example 4*

In a manner similar to that described in the above examples, 106 kilos of crude ketene containing acetic anhydride as an impurity are processed with di-(α-ethyl)-butyl ether. In order to maintain the several components completely miscible, the temperature in the pump is maintained at from 60° C. to 65° C. A satisfactory separation of the acetic anhydride layer is obtained by cooling the resulting mixture with water to a temperature of from 15° C. to 20° C. The acetic anhydride layer separates out at the bottom of the separator. The acetic anhydride removed comprises 3.6% of the crude ketene while the diketene removed comprises 1.2% of the crude ketene processed.

*Example 5*

In a manner similar to that described above, di-(α-ethyl)-hexyl ether is employed in the purification of crude ketene, the pump temperature being maintained at about 85° C. with the separation of the acetic anhydride layer being effected by cooling to about room temperature, i.e., about 25° C. after the processed ketene has been removed. The acetic anhydride separated in this manner constitutes 2.8% of the crude ketene purified and the diketene about 1.7% of the crude ketene.

What is claimed is:

1. Process for the purification of crude ketene produced by the catalytic thermal decomposition of acetic acid at reduced pressure, which comprises separating the greater part of the water and acetic acid therein by cooling, bringing the ketene-containing thermal decomposition reaction product remaining into intimate contact with a liquid of the group consisting of hexachlorobutadiene and those aliphatic ethers having a boiling point above 130° C. while at a temperature of 0° C. to 90° C. whereby said liquid and the impurities in said thermal decomposition product are completely miscible, and then separating the ketene from said liquid.

2. Process for the purification of crude ketene produced by the catalytic thermal decomposition of acetic acid at reduced pressure, which comprises separating the greater part of the water and acetic acid in the thermal decomposition reaction product by cooling, bringing the ketene-containing thermal decomposition reaction product remaining into intimate contact with a liquid of the group consisting of hexachlorobutadiene and those aliphatic ethers having a boiling point above 130° C. while at a temperature of 20° C. to 60° C. whereby said liquid and the impurities in said thermal decomposition product are completely miscible, and then separating the ketene from said liquid.

3. Process in accordance with claim 2 wherein the liquid remaining after the separation of the ketene is cooled below the temperature of complete miscibility of extractant and impurities to cause the liquid to phase out, and returning the liquid phase substantially free of the impurities to the purification step.

4. Process for the purification of crude ketene produced by the catalytic thermal decomposition of acetic acid at reduced pressure, which comprises separating the greater part of the water and acetic acid therein by cooling and then bringing the ketene-containing thermal decomposition reaction product remaining into intimate contact with hexachlorobutadiene while maintaining the latter in the liquid phase and at a temperature of above 20° C., separating the ketene phase from the hexachlorobutadiene phase, cooling the latter phase until it phases out to form two separate phases one of which contains the major part of the acetic anhydride separated from the thermal decomposition reaction product, and returning the other phase to the separation step.

5. Process in accordance with claim 4 wherein the hexachlorobutadiene liquid phase is cooled to a temperature below 20° C. to cause the latter to phase out.

6. Process for the purification of crude ketene produced by the catalytic thermal decomposition of acetic acid at reduced pressure, which comprises separating the greater part of the water and acetic acid therein by cooling and then bringing the ketene-containing thermal decomposition reaction product remaining into intimate contact with di-n-butyl ether while maintaining the latter in the liquid phase and at a temperature of above 0° C., separating the ketene phase from the di-n-butyl ether phase, cooling the latter phase until it phases out to form two separate phases one of which contains the major part of the acetic anhydride separated from the thermal decomposition reaction product, and returning the ether phase to the seperation step.

7. Process in accordance with claim 6 wherein the di-n-butyl ether is cooled to a temperature of below 0° C. to separate the impurities therefrom.

8. Process for the purification of crude ketene produced by the catalytic thermal decomposition of acetic acid at reduced pressure, which comprises separating the greater part of the water and acetic acid therein by cooling and then bringing the ketene-containing thermal decomposition reaction product remaining into intimate contact with di-n-hexyl ether while maintaining the latter in the liquid phase and at a temperature of above 47° C., separating the ketene phase from the di-n-hexyl ether phase, cooling the latter phase until it phases out to form two separate phases one of which contains the major part of the acetic anhydride separated from the thermal decomposition reaction product, and returning the ether phase to the separation step.

9. Process in accordance with claim 8 wherein the di-n-hexyl ether is cooled to a temperature of below 47° C. to separate the impurities therefrom.

10. Process for the purification of crude ketene produced by the catalytic thermal decomposition of acetic acid at reduced pressure, which comprises separating the greater part of the water and acetic acid therein by cooling and then bringing the ketene-containing thermal decomposition reaction product remaining into intimate contact with di-($\alpha$-ethyl)-hexyl ether while maintaining the latter in the liquid phase and at a temperature of above 85° C., separating the ketene phase from the di-($\alpha$-ethyl)-hexyl ether phase, cooling the latter phase until it phases out to form two separate phases one of which contains the major part of the acetic anhydride separated from the thermal decomposition reaction product, and returning the ether phase to the separation step.

11. Process in accordance with claim 10 wherein the di-($\alpha$-ethyl)-hexyl ether is cooled to a temperature of below 85° C. to separate the impurities therefrom.

12. Process for the purification of crude ketene produced by the catalytic thermal decomposition of acetic acid at reduced pressure, which comprises separating the greater part of the water and acetic acid therein by cooling and then bringing the ketene-containing thermal decomposition reaction product remaining into intimate contact with di-($\alpha$-ethyl)-butyl ether while maintaining the latter in the liquid phase and at a temperature of above 60° C. to 65° C., separating the ketene phase from the di-($\alpha$-ethyl)-butyl ether phase, cooling the latter phase until it phases out to form two separate phases one of which contains the major part of the acetic anhydride separated from the thermal decomposition reaction product, and returning the ether phase to the separation step.

13. Process in accordance with claim 12 wherein the di-($\alpha$-ethyl)-butyl ether is cooled to a temperature of below 60° C. to separate the impurities therefrom.

References Cited in the file of this patent
UNITED STATES PATENTS

| | | |
|---|---|---|
| 2,045,739 | Wiezevich | June 30, 1936 |
| 2,202,046 | Dreyfus et al. | May 28, 1940 |